Dec. 28, 1937. C. R. SEABORNE Re. 20,606
PAPER MAKING MACHINE
Original Filed Nov. 24, 1923
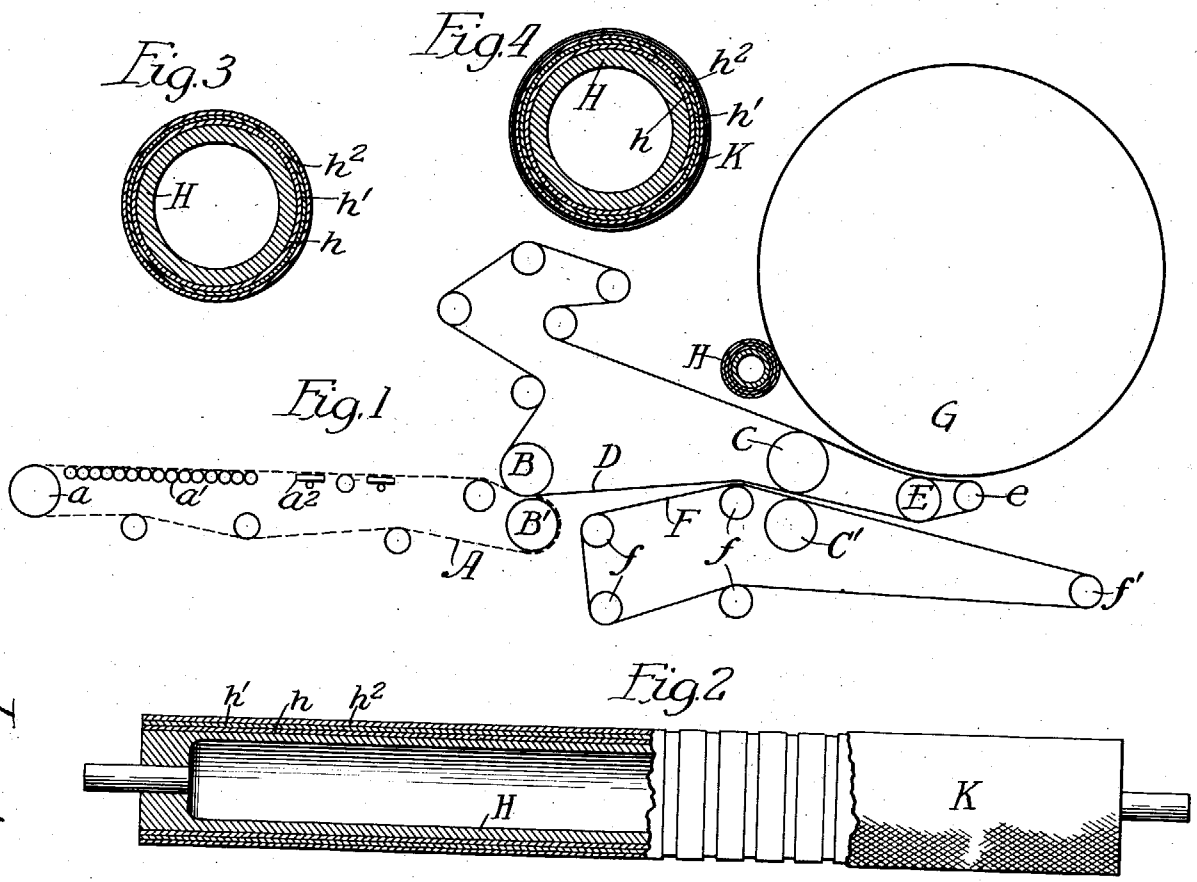
Inventor:
Charles R. Seaborne,
By Fisher, Clapp, Soans & Pond
Attys.

Reissued Dec. 28, 1937

Re. 20,606

UNITED STATES PATENT OFFICE 20,606

PAPER MAKING MACHINE

Charles R. Seaborne, Appleton, Wis., assignor, by mesne assignments, to American Lakes Paper Company, Waukegan, Ill., a corporation of Delaware Original No. 1,517,018, dated November 25, 1924, Serial No. 676,705, November 24, 1923. Application for reissue June 25, 1936, Serial No. 88,268

5 Claims. (Cl. 92—48)

The present invention has for its object to provide improved means whereby a web of paper as it passes through a paper-making machine may be impressed with designs or marks commonly termed "water-marks", which serve to identify or give distinctive character to the paper. Water marks are of two general types. One of these types includes the ordinary identifying bond or trade-mark which is placed in practically all high quality papers. This mark is ordinarily visible only by transmitted light, i. e. by holding the sheet of paper wherein it appears against a source of light. The other type of water mark includes those markings which are provided for ornamental purposes. Wrapping paper is frequently marked in this manner as an advertising means. These ornamental markings are clearly visible either by reflected or transmitted light and in this respect differ from the ordinary water mark which is visible only by transmitted light.

To produce the ordinary or trade-mark type of water marking, the type first described, the time-honored practice has been to apply small raised type members to the dandy roll of the paper making machine. The dandy roll, as is well known in the art, is a very light weight, reticulated hollow roll which rests upon the upper surface of the paper web while it is still carried on the Fourdrinier wire of the paper making machine. More recently, these trade-marks or identifying marks have been produced by the aid of so-called "Behrend bands" which are small, flexible, narrow bands of rubber upon the outer surface of which are molded in relief, characters or designs corresponding to the desired trade-mark or water mark. These "Behrend bands" and their supports are arranged on a shaft extending across the paper machine and bear lightly upon the paper web usually at some point between the couch roll and the main drying section of the machine. With this ordinary type of marking the marks are usually relatively independent of each other and widely spaced, hence the designs are not required to be synchronized or to register with each other, and any creeping of the bands on their supports is not objectionable. Furthermore, since the marks are purely for identification for trade-mark purposes, sharpness of outline is not required, nor need the mark possess any more distinctness than is required to enable it to be identified by transmitted light. The principles of construction and manner of using Behrend bands are disclosed in United States Reissue Patent No. 12,218 issued to Ernest R. Behrend on May 10, 1904.

On the other hand, in ornamentally marking paper such as wrapping paper by means of the water marking method, sharpness of outline, distinctness and contrast when examined by ordinary light are pre-requisites for saleability, and a radically different type of device and method of marking must be employed. In order to obtain the desired contrast in the finished sheet, pressures many times greater than those employed in ordinary identification water marking as by the dandy roll or Behrend band methods must be employed, and such pressures must obviously be applied at some point in the travel of the web where the web is sufficiently strong, i. e. sufficiently dry, to withstand the pressure imposed without injury. In the case of wrapping paper, this means that the marking must be effected after the paper has been applied to the heated drier or to one of the heated driers of the drying end of the machine. The type of marking equipment and the marking methods in general use in this country for ornamental marking paper prior to my invention are illustrated in United States Patent No. 733,709, issued to O. M. Farwell on July 14, 1903.

Rolls according to the Farwell invention are used solely for the production of ornamentally marked paper, and during the marking operation the web of paper passes through the nip formed by the marking roll and the drying cylinder. Because of the heavy compressive force necessary in order to effect a satisfactory imprinting of the design on the web, and to prevent cutting of, or injury to, the web it has been found necessary to wrap the surface of the marking roll with one or more layers of muslin or like fabric through which the impression of the types or plates was delivered. A serious objection has been found to the employment of marking rolls bearing metal types or plates and wrapped with muslin or like fabric, as the fabric is speedily cut through or worn by the type so that it becomes necessary to frequently withdraw the marking roll in order to re-wrap the same with a fresh cloth. Particularly is this objection encountered with marking rolls of very considerable length, since with such rolls it is found necessary, in order to compensate for the "springing" of the rolls, to form the rolls with a slight crown from the ends to the center, with the result that certain parts of the marking roll more speedily wear the fabric than do other parts of the roll. In practice it is found that it becomes necessary to withdraw and re-wrap marking rolls having metal type or plates upon their peripheries as often as every three or four hours, and particularly with very wide machines, such, for example, as are used in forming webs of paper 124 inches in width, the cost of supplying fresh wrappings for a marking roll will add very largely to the manufacturers' cost of the paper. Moreover, when the marking rolls are withdrawn from the paper-making machines to permit their rolls to be re-wrapped, it is customary to allow the operation of the machine to continue, with the result that the paper issuing from the machine while the rolls are thus withdrawn is unmarked and is subsequently gathered up and returned to the beaters to be reconverted into pulp. This occasions a further and very considerable loss to the manufacturer, as the time consumed in re-wrapping such marking rolls is usually about twenty minutes.

A further serious objection arises in the use of marking rolls such as are disclosed in the Farwell patent due to their inherent inability to be used in direct contact with the web of paper which is being marked in that the layer or layers of fabric intermediate the marking surface of the roll and the web prevent the securing of fine lined markings on the web.

The principal object of the present invention is to overcome the objectionable characteristics of the Farwell method of ornamentally marking paper and to provide a marking roll which may be used in direct contact with the web of paper which is to be marked thereby.

Reduced to its simplest aspects, the present invention consists in substituting for the prior art metal surface Farwell marking roll a marking roll which comprises a rigid central support and a continuous outer sleeve-like layer of hard rubber the surface of which is ground concentric with the axis of rotation of the roll. From the finished crowned surface of this outer sleeve, portions of the material will be removed as by grinding or cutting, i. e. engraving, so as to leave lands constituting the design which it is desired to mark on the paper. During the marking operation these lands will compress the web so as to form a corresponding design thereon which will appear darker than the uncompressed portions of the web when the finished sheet is viewed by ordinary or reflected light. The pressures utilized in accomplishing marking by the use of this roll are of course commensurate with the pressures utilized in accomplishing marking by the Farwell roll and hence are of great magnitude.

Through this relatively simple arrangement a number of highly desirable and most unexpected results are accomplished. Particularly the marking surface of such a roll may be caused to directly contact the web which is to be marked thereby without danger of cutting or injuring that web during the marking operation. This means that much more accurate, much more delicate, and much more sharply defined markings may be accomplished through the use of my invention than has heretofore been considered possible. Further, as will be pointed out in subsequent paragraphs, very substantial reductions in the cost of making the paper is accomplished. A preferred form of the invention is illustrated in the accompanying drawing wherein—

Fig. 1 is a diagrammatic view showing a paper-making machine of the Fourdrinier type having my invention applied thereto;

Fig. 2 is a view in vertical longitudinal section through my improved marking roll;

Fig. 3 is an enlarged view in vertical section through the marking roll; and

Fig. 4 is a view similar to Fig. 3, but showing the marking roll wrapped with muslin or like fabric.

The paper-making machine illustrated in Fig. 1 of the drawing is shown as comprising the usual forming wire A that passes over a breast roll *a* at the pulp-receiving end of the machine, over the tube rolls *a'*, suction boxes $a^2$ and between couch rolls B and B', in a manner well understood. Around the upper couch roll B and under the press roll C passes an endless felt D, this felt also passing around a pressure roll E, a tail roll *e*, and around a series of tightener, guide and carrying rolls shown above the upper couch roll B. A lower endless felt F passes around a plurality of felt-carrying rolls *f* over the lower press roll C', and around an end felt roll *f'*. The web of paper as it passes from the surface of the forming wire A adheres to the bottom of the upper endless felt D and passes with said felt and over the lower endless felt F between the press rolls C and C', and thence with the felt D around the tail roll *e* and between the pressure roll E and the drying cylinder G to the surface of which the endless paper web adheres. From the drying cylinder G the web of paper will be passed in the usual manner either directly to the winding reels or through additional drying cylinders or calender rolls.

My improved marking roll is preferably located adjacent the drying cylinder G so as to cooperate therewith in marking the surface of the partially dried endless paper web; but this marking roll may be located in any other suitable position to cooperate with any other roll for the marking of the paper web. This marking roll in the preferred form of the invention (see Figs. 1 to 4 of the drawing), comprises a metal cylinder H, the surface of which is covered with a layer of hard rubber *h* vulcanized thereon and forming preferably a continuous sleeve or tube around the surface of the roll body H. In practice it is found that this layer of vulcanized hard rubber *h* may be about ¼ of an inch in thickness, although this thickness may be increased or diminished as desired. Over the layer of hard rubber H and vulcanized thereto is another layer or sleeve of soft rubber *h'* which may be approximately about $\frac{3}{16}$ of an inch in thickness, and over the layer of soft rubber *h'* and vulcanized thereto is an outer layer or sleeve of hard rubber $h^2$ that is preferably about $\frac{3}{16}$ of an inch in thickness. By providing the surface of the metal cylinder H with a layer of hard rubber vulcanized thereto, it is found that all possibility of any slipping or creeping occurring between the metal surface of the cylinder H and the hard rubber cover or layer *h* is avoided; and this surface or cover *h* of hard rubber affords a base to which the soft rubber layer *h'* of the cover may be securely vulcanized. This soft rubber layer *h'* affords a cushion for the outer layer $h^2$ of hard rubber in or on the surface of which is to be formed the designs, type, or the like, whereby the marking or ornamenting of the paper web will be effected. Inasmuch as the outer layer of hard rubber $h^2$ is vulcanized to the layer of soft rubber *h'*, all possibility of any slipping or creeping between these two surfaces is avoided.

Preferably the outer diameter of the metal cylinder H is uniform from end to end, but in order to compensate for any "springing" of the marking roll, particularly if this roll be a very long one, the peripheral surface of the outermost hard rubber layer or cover $h^2$ will be turned or ground down, the grinding or turning being diminished towards the center of the roll, so that the roll is thus left slightly crowned. From the finished, crowned surface of the outermost cover $h^2$ portions of the material will be removed by grinding or cutting i. e. engraving, so as to leave lands constituting the designs which it is desired to impress upon the surface of the paper web. In Fig. 2 of the drawing, the surface of the hard rubber cover $h^2$ is shown as formed with a series of circumferential ribs and grooves adapted to mark stripes upon the endless paper web. One advantage of providing a soft rubber cushion $h'$ for the outermost hard rubber cover $h^2$ is that in case any irregularity or excess thickness occurs in the paper web, the soft rubber cushion $h'$ will permit the hard rubber cover $h^2$ to yield or give and thus avoid all danger of impairing the impression surface of the marking roll. Moreover, it is practically impossible to form the surface of the drying cylinder G perfectly uniform from end to end and so maintain it under variations in temperatures to which such cylinder is subjected, and by yieldingly mounting the hard rubber cover $h^2$ carrying the impression surface upon a yielding cushion or cover $h'$, the inequalities of the drying cylinder are compensated for and uniformity of impression upon the paper is secured.

In some cases where it is desired to modify or soften the effect of my marking roll and to give to the impressions made upon the paper web an appearance resembling a fabric weave, it is desirable to cover the outer surface of the marking roll with one or more layers of textile fabric, such as muslin or the like, K, as illustrated in Figs. 2 and 4 of the drawing. The fabric K after being wrapped around the roll will have its ends suitably fastened to prevent it slipping or working loose. If preferred the fabric cover K may be made in tubular form so as to be slipped over the end of the roll and shrunk thereon.

Aside from the fact that a marking roll constructed in accordance with my invention has an initial cost far below that of a metal marking roll of the usual design, the marking roll of my invention may be used in direct contact with the web of paper to be marked, thereby accomplishing a much more satisfactory impression of the design upon the paper. In addition, there are a number of important economical advantages resulting from the use of my invention. Since the marking roll of my invention need not be wrapped or encircled by a sheet of fabric the cost incident thereto is avoided as well as the delays incident to re-wrapping the marking rolls.

In describing the form of the invention illustrated in the drawing, I have referred to the layers of rubber that encircle the body of the marking roll as being preferably continuous tubes or sleeves. In practice each of these tubes or sleeves is preferably formed by wrapping a sheet of rubber about the periphery of the body of the roll, the lap edges of the sheet being scarfed and united by rubber cement so that in the subsequent vulcanizing operation each sheet becomes in effect a continuous tube.

While the density or plasticity of the layers or covers of rubber upon the marking roll may be varied within wide limits, and while the expressions "hard rubber" and "soft rubber" will sufficiently define, to those skilled in the art, the difference between the character of the layers or covers, I may state that I have found in practice that a very satisfactory density or plasticity for the several layers or covers may be somewhat as follows, viz.: For the innermost hard rubber layer or cover of the marking roll, the density or plasticity as measured by the familiar Pusey & Jones plastometer using a .125 ball is approximately 0/100 mm.; while the density or plasticity of the outermost hard rubber sheet or cover is between 5/100 to 15/100 mm.; and the density or plasticity of the intermediate sheet or cover of soft rubber is somewhat in excess of 80/100 mm.

I claim the following as my invention:

1. In combination, a drying cylinder of a paper making machine, and a marking roll arranged to be forced toward said cylinder so as to directly engage and compress a web of paper manufactured by said paper making machine between said drying cylinder and said marking roll to accomplish an ornamental marking thereof, said marking roll comprising: a rigid core, a continuous, single, one-piece outer sleeve-like layer of hard rubber, and means resiliently supporting said outer sleeve-like layer relatively to said core, said means including a cushioning layer of relatively soft rubber interposed between said core and said outer sleeve-like layer; the outer surface of said outer sleeve-like layer being finished concentric with respect to the axis of rotation of said marking roll, as by a grinding operation, said marking roll and drying cylinder being relatively crowned so as to maintain a substantially uniform nip pressure across a web of paper, portions of the material of said outer ground surface being removed, as by an engraving operation, so as to leave lands which constitute a design that it is desired to impart to a web of paper during a marking operation thereon, said lands being sufficiently rigid to effect a desired marking and being sufficiently resilient to avoid injuring a web of paper when used in direct contact therewith during a marking operation.

2. In combination, a drying cylinder of a paper making machine, and a marking roll arranged to be forced towards said cylinder so as to directly compress a web of paper manufactured by said paper making machine between said drying cylinder and said marking roll to accomplish an ornamental marking thereof, said marking roll comprising a generally cylindrical, relatively rigid core, a continuous, single, one-piece outer sleeve-like layer of hard rubber, and means resiliently supporting said outer sleeve-like layer relatively to said core including a cushioning layer of relatively soft rubber interposed between said core and said outer sleeve-like layer, and a second sleeve-like layer of hard rubber disposed intermediate said cushioning layer and the outer surface of said core, said second sleeve-like layer of hard rubber being vulcanized to said cushioning layer and secured to said core, the outer surface of said outer sleeve-like layer being finished concentric with respect to the axis of rotation of said marking roll, as by a grinding operation, and being crowned sufficiently to maintain uniform nip pressure across a web of paper, portions of the material of said outer ground surface being removed, as by an engraving operation, so as to leave lands which constitute a design that it is desired to impart to a web of paper during a marking operation thereon, said lands being sufficiently rigid to effect a desired marking and being sufficiently resilient to avoid injuring a web of paper when used in direct contact therewith during a marking operation.

3. In a paper making machine suitable for the manufacture of water marked paper, the combination of: a drying cylinder, and a marking roll for directly engaging and pressing a web of paper against said drying cylinder with sufficient pressure to impart an ornamental marking thereto, said marking roll being of multi-layer, crowned, construction and comprising: a rigid, rotatable central support which is generally cylindrical in form, a continuous, single, one-piece outer sleeve-like layer of hard rubber which is ground concentric to the axis of rotation of said central support and which has a design engraved therein that it is desired to impart to a web of paper, and means attaching said outer sleeve-like layer to said central support for rotation therewith including a cushioning layer of relatively soft rubber intermediate said rigid support and said outer sleeve-like layer.

4. In combination, a drying cylinder of a paper making machine, and a marking roll for directly engaging and pressing a web of paper against said drying cylinder with sufficient pressure to impart an ornamental marking thereto, said marking roll comprising a rigid core, an inner sleeve-like layer of hard rubber secured to said core, an outer generally cylindrical continuous, single, one-piece sleeve of hard rubber, and a cushioning sleeve of relatively soft rubber arranged intermediate said inner layer and said outer sleeve of hard rubber and vulcanized to each, said outer sleeve having portions of the material of its outer face removed, as by an engraving operation, to form lands which constitute a design that it is desired to impart to said web of paper.

5. In combination, a drying cylinder of a paper making machine, and a marking roll for directly engaging and pressing a web of paper against said drying cylinder with sufficient pressure to impart an ornamental marking thereto, said marking roll comprising a rigid core, an inner sleeve-like layer of hard rubber having a density or plasticity of approximately 0/100 mm. (as measured by a Pusey & Jones plastometer having a 0.125'' ball) secured to said core, an outer generally cylindrical continuous, single, one-piece sleeve of hard rubber having a density or plasticity of between 5/100 to 15/100 mm., and a cushioning sleeve of relatively soft rubber having a hardness or density in excess of 80/100 mm. arranged intermediate said inner layer and said outer sleeve of hard rubber and vulcanized to each, said outer sleeve having portions of the material of its outer face removed, as by an engraving operation, to form lands which constitute a design that it is desired to impart to said web of paper.

CHARLES R. SEABORNE.